(12) United States Patent
Bos

(10) Patent No.: US 8,091,243 B2
(45) Date of Patent: Jan. 10, 2012

(54) PRECISION STAGE

(75) Inventor: Edwin J. C. Bos, Dommelen (NL)

(73) Assignee: Xpress Holding B.V., Eindhoven (NL)

( * ) Notice: Subject to any disclaimer, the term of this patent is extended or adjusted under 35 U.S.C. 154(b) by 0 days.

(21) Appl. No.: 12/766,344

(22) Filed: Apr. 23, 2010

(65) Prior Publication Data

US 2010/0269362 A1 Oct. 28, 2010

(30) Foreign Application Priority Data

Apr. 24, 2009 (EP) .................................. 09158750

(51) Int. Cl.
*G01B 5/004* (2006.01)
*B23Q 1/25* (2006.01)
(52) U.S. Cl. .......................................... 33/1 M; 33/568
(58) Field of Classification Search ............... 33/1 M, 33/503, 568
See application file for complete search history.

(56) References Cited

U.S. PATENT DOCUMENTS

| | | | |
|---|---|---|---|
| 4,800,652 A | 1/1989 | Ballas et al. | |
| 5,280,677 A * | 1/1994 | Kubo et al. | 33/1 M |
| 6,047,610 A | 4/2000 | Stocco et al. | |
| 7,275,332 B2 * | 10/2007 | Blanding | 33/1 M |
| 2003/0204959 A1 * | 11/2003 | Hall | 33/1 M |
| 2005/0204571 A1 * | 9/2005 | Mies et al. | 33/503 |
| 2008/0040941 A1 | 2/2008 | Reynaerts et al. | |
| 2010/0146802 A1 * | 6/2010 | Ehlerding | 33/503 |

FOREIGN PATENT DOCUMENTS

| | | |
|---|---|---|
| WO | WO 02/091436 | 11/2002 |
| WO | WO 2004/041486 | 5/2004 |

OTHER PUBLICATIONS

EP Search Report dated Sep. 4, 2009 for EP Application No. 09158750.1.
Vermeulen, M.M.P.A. et al., "Design of a High-Precision 3D-Coordinate Measuring Machine", Annals of the CIRP, vol. 47, No. 1, (1998), pp. 447-450.
Seggelen, J.K.v. et al., "Design of a 3D-Coordinate Measuring Machine for Measuring Small Products of Array", 4 pages.

* cited by examiner

*Primary Examiner* — Brad Bennett
(74) *Attorney, Agent, or Firm* — Nixon & Vanderhye P.C.

(57) ABSTRACT

The invention relates to a positioning system for positioning and/or measuring a movable object, wherein the movable object (10) has an object position that is defined with respect to a at least two axes (X, Y) extending in at least two different directions. The movable object (10) has a first surface (SX) and a second surface (SY) having mutually different orientations. The first surface (SX) makes a first angle ($\alpha$) with the first direction and the second surface (SY) makes a second angle ($\beta$) with the second direction. The positioning system comprises: i) a first bearing (BX) for establishing a first surface position of the first surface (SX) with respect to the first axis (X) and for allowing a movement of the movable object (10) in a first plane parallel to the first surface (SX) in at least the second direction; ii) a second bearing (BY) for establishing a second surface position of the second surface (SY) with respect to the second axis Y and for allowing a movement of the movable object (10) in a second plane parallel to the second surface (SY) in at least the first direction. The system further comprises respective actuators for establishing the respective positions. Such system may be further extended to three dimensions. The advantage of the positioning system is that during movement of the movable object less masses are moved. The positioning system is widely applicable. The invention further relates to a machine or a tool comprising such positioning system.

20 Claims, 9 Drawing Sheets

PRECISION STAGE

FIELD OF THE INVENTION

The invention relates to a positioning system for positioning and/or measuring a movable object. The invention further relates to a machine or a tool comprising such positioning system, in particular in applications where objects have to be positioned with high precision.

BACKGROUND OF THE INVENTION

Precision engineering is a sub-discipline of mechanical engineering concerned with designing machines, fixtures, and other structures that have exceptionally high tolerances, are repeatable, and are stable over time. These approaches have applications in machine tools, micro-electromechanical systems (MEMS), optomechanical designs, and many other fields, such as high-precision coordinate measurement machines (CMM's). In precision Engineering components are getting smaller and tolerance becomes tighter, so demands for accuracy are increasing.

A coordinate measuring machine (CMM) is a device for measuring the physical geometrical characteristics of an object. This machine may be manually controlled by an operator or it may be computer controlled. Measurements are defined by a probe attached to the z-axis of this machine (however in other embodiments it may be attached to other axes as well). This probe contacts the part of interest and allows collecting discrete points on the object's surface.

The typical CMM is composed of three axes, X, Y and Z. These axes are orthogonal to each other in a typical three dimensional coordinate system. Each axis has a very accurate scale system that indicates the location of that axis. All three axes are displayed on a digital readout. The probe is used to touch different spots on the object being measured to obtain probe points. The machine then uses the X,Y,Z coordinates of each of these probe points to determine the size and position of the object. There are newer models that have probes that drag along the surface of the part taking points at specified intervals. This method of CMM inspection is less accurate than the conventional touch-probe method but in most cases it is faster. The next generation of scanning, known as laser scanning, is advancing very quickly. This method uses laser beams that are projected against the surface of the part. Many thousands of points can then be taken and used to not only check size and position, but to create a 3D image of the part as well. This "point-cloud data" can then be transferred to CAD software to create a working 3D model of the part. The laser scanner is often used to facilitate the "reverse engineering" process. This is the process of taking an existing part, measuring it to determine its size, and creating engineering drawings from these measurements. This is most often necessary in cases where engineering drawings may no longer exist or are unavailable for the particular part that needs replacement.

A coordinate measuring machine (CMM) is also a device used in manufacturing and assembly processes to test a part or assembly against the design intent. By precisely recording the X, Y, and Z coordinates of the target, points are generated which can then be analyzed via regression algorithms for the construction of features. These points are collected by using a probe that is positioned manually by an operator or automatically via Direct Computer Control (DCC).

One of such CMM's is known from: M. M. P. A. Vermeulen, et. al., *"Design of a High-Precision 3D-Coordinate Measuring Machine"*, Annals of the CIRP Vol. 47/1/1998, p. 447-450. The known CMM comprises a movable platform to which a probe has been connected. The probe is mounted to on a vertical slide in the movable platform such that it can be moved up and down in a z-direction. The vertical slide is provided with an internal scale. The movable platform is movable in the x-direction and y-direction through two orthogonal beams. This is achieved in that the movable platform is coupled to a base through two intermediate bodies which are movable along respective orthogonal guiding beams on the base. The intermediate bodies are provided with respective holes through which the orthogonal beams can be moved. The x-scale and y-scale are supported on the respective orthogonal beams, while the respective measuring heads are provided on the intermediate bodies. The machine slides (beams and slides) are built up as a closed-box plate construction. For all slides passively compensated thrust air bearings were chosen.

A problem with the known CMM is that during movements of the platform relatively large masses are moved.

SUMMARY OF THE INVENTION

It is an object of the invention to provide a positioning system for positioning and/or measuring a movable object in which during movement of the object less masses are moved.

The invention is defined by the independent claims. The dependent claims define advantageous embodiments.

In a first aspect, the invention relates to a positioning system as claimed in claim 1.

The effect of the features of the positioning system in accordance with the invention will be explained hereinafter. In operational use, a movable object is provided having two non-parallel surfaces, wherein a position with respect to the first axis of the first surface is determined through the bearing and the first actuator. The axes each make a respective angle with the respective surfaces. Moreover, the axes extend into different directions. This combination of axes and surfaces enables the definition of the position of the movable object in two dimensions. The bearing that is provided on the first surface serves to determine the position of the first surface with respect to the first axis. Furthermore, the bearing allows movement of the movable object along the first surface in at least the second direction. The latter feature has the following effect. When the position of the second surface (and thereby the position of the movable object) with respect to the second axis is changed (by the second actuator) the bearing is able to move relative to the first surface in a direction opposite to the direction in which the second surface is moved. In other words, the bearing features the moving of the movable object in a same direction as the second surface is moved. As a consequence of that, at least a part of, and preferably the whole of, the first bearing (and any parts connected to it in the positioning system) does not move. And thus the amount of mass, which is moved when the second surface is moved, is reduced.

Similarly, this advantageous effect is also achieved in the other direction, i.e. in case of movements of first surface (and thus the movable object) into a direction of the first axis. When the position of the first surface (and thereby the position of the movable object) with respect to the first axis is changed the second bearing is able to move relative to the second surface in a direction opposite to the direction in which the first surface is moved. In other words, the second bearing features the moving of the movable object in a same direction as the first surface is moved. As a consequence of that, at least part of, and preferably the whole of, the second bearing (and any parts connected to it in the positioning system) does not move. And thus the amount of mass, which is moved when the first surface is moved, is reduced. And this effect sums up to the earlier mentioned effect of the first bearing.

An embodiment of the positioning system in accordance with the invention further comprises a first linear encoder coupled to the first bearing and a second linear encoder coupled to the second bearing, wherein the first linear encoder is arranged for measuring the first surface position in operational use, and the second linear encoder is arranged for measuring the second surface position in operational use. In this embodiment the establishing of the position is combined with measuring the position, which reduces the complexity of the positioning system to a great extent (no separate measuring systems are required). In a first variant the first actuator is connected to the first bearing via the first linear encoder and the second actuator is connected to the second bearing via the second linear encoder. In a second variant the respective actuators are directly coupled to the respective bearings as well as the respective linear encoders (actuator and linear encoder effectively connected in parallel).

In an embodiment of the positioning system in accordance with the invention each respective linear encoder comprises a respective linear scale and a respective measurement device for reading the respective linear scale. The use of linear scales in this embodiment renders the system relatively simple, accurate and cheap.

In an embodiment of the positioning system in accordance with the invention the actuators are coupled to their corresponding bearing by a coupling element for allowing a rotation of the movable object in operational use. This embodiment facilitates rotation of the respective surface and thereby rotation of the movable object. For example, if the respective bearing enables rotation in a plane of the respective surface only, then the coupling element may facilitate rotation in one or more of the other two rotation directions, thus effectively releasing at least one more degree of freedom of the movable object.

An embodiment of the positioning system in accordance with the invention comprises the respective bearing on at least one of the respective surfaces comprises at least two sub-bearings that are spaced apart from each other, wherein the sub-bearings are arranged for further establishing a surface orientation of the respective surface in operational use and for allowing a movement of the movable object in a plane parallel to the respective surface in at least the first and/or second direction in operational use, wherein the surface orientation is determined by a mutual position of the sub-bearings. This embodiment constitutes a first main variant which facilitates rotation of the movable object. All corresponding features relating to the bearings, actuators and coupling elements discussed in earlier embodiments also applicable to the sub-bearings.

An embodiment of the positioning system in accordance with the invention comprises the respective actuator coupled to the respective bearing on at least one of the respective surfaces comprises at least two sub-actuators that are spaced apart from each other, wherein the sub-actuators are arranged for further establishing a bearing orientation of the respective bearing, wherein the bearing orientation is determined by a mutual position of the sub-actuators. This embodiment constitutes a second main variant which facilitates rotation of the movable object. All corresponding features relating to the bearings, actuators and coupling elements discussed in earlier embodiments are also applicable to the sub-actuators.

It must be noted that apart from the two main variants which are explicitly mentioned there are a lot more variants (i.e. the last two-mentioned embodiments may be combined together), which do not depart from the invention as claimed. For example, rotation is also possible when using only one bearing/actuator combination per surface, but then an additional surface, opposite (but not necessarily parallel) to the respective surface, is required. Moreover, in that embodiment the axes may not be in line with each other, i.e. there must be an off-set between them (they need not essentially extending parallel). See description for more information about the variations.

Other variations concern the addition of one or more short-range sensors to the system for either measuring errors or orientations as discussed in the next two paragraphs. A first variant of the system further comprises at least one short-range sensor on at least one of the respective surfaces for measuring an orientation of a respective one of the bearings or a respective one of the surfaces in operational use, and/or for measuring a positioning error caused by the respective bearing in operational use.

In embodiments where the respective bearing is an air bearing the short-range sensor can be used to measure the air gap between the air bearing and the respective surface. In a second variant the system further comprises at least one further short-range sensor on at least one of the respective bearings for measuring at least one respective bearing orientation of the at least one respective bearings in operational use.

In an embodiment of the positioning system in accordance with the invention, in operational use the object position of the movable object is further defined with respect to a third axis extending in a third direction, wherein the third direction is different from the first direction and the second direction, and the movable object has a third surface that has an orientation which is different from the respective orientations of the first surface and the second surface, wherein the third surface makes a third angle with the third direction, and the positioning system further comprises a third bearing for establishing a third position of the third surface with respect to the third axis and for allowing a movement of the movable object in a third plane parallel to the third surface in at least the first direction and/or the second direction. This embodiment constitutes a 3D variant on the earlier embodiments. All features relating to the bearings, actuators and coupling elements discussed in earlier embodiments also applicable to the third dimension.

In an embodiment of the positioning system in accordance with the invention the first surface, the second surface and the third surface are mutually oriented such that, in operational use, their orientations with respect to gravity are substantially the same. The advantage of this embodiment is that all bearings have same orientation with respect to the gravity direction, which opens up other technical advantages as will be apparent from the embodiments discussed hereinafter.

In an embodiment of the positioning system in accordance with the invention the first direction is orthogonal to the first surface, and the second direction is orthogonal to the second surface, and the third direction is orthogonal to the third surface. In this embodiment the gravity force is distributed over all actuators in the system. This leads to a higher accuracy of the positioning and/or measurement of the movable object.

In an embodiment of the positioning system in accordance with the invention the respective surfaces are orthogonal with respect to each other. In this embodiment cross-talk (due to mutual dependencies) between the respective axes is reduced.

In an embodiment of the positioning system in accordance with the invention the respective axes are orthogonal with respect to each other. In this embodiment the coordinates comply with a Cartesian system, which renders the positioning system less complex than other non-Cartesian systems.

In an embodiment of the positioning system in accordance with the invention at least two of the respective axes substantially cross in a single point, which corresponds with a predetermined functional point of the system. The advantage of this embodiment is that deviations due to guideway errors are reduced, i.e. the system is Abbe compliant. It must be noted that, in accordance with embodiments of the invention, the respective axes can coincide with the (functional) axes of at least two measurement devices, e.g. the linear encoders, and/or at with least 2 actuator systems.

In an embodiment of the positioning system in accordance with the invention the respective bearings are contactless bearings. Contactless bearings have hardly friction, which renders the positioning system more accurate. Further advantages of using contactless bearings are a high accuracy when the bearing moves over the surface (the contactless bearing partly compensates any height variations in the surface) which renders the positioning system more accurate.

In an embodiment of the positioning system in accordance with the invention the respective bearings are selected from a group comprising: air bearing, magnetic bearing, and electromagnetic bearing.

In an embodiment of the positioning system in accordance with the invention the respective bearings are preloaded by vacuum, magnetic force, spring force, or gravity.

In an embodiment of the positioning system in accordance with the invention the movable object forms part of the system. In such embodiment the movable object may be a support or a table for carrying a further object, for example a probe tip, a picker, etc.

In a second aspect, the invention relates to a machine or a tool comprising the positioning system in accordance with the invention and further comprising a frame for supporting the positioning system. The positioning system in accordance with the invention may be advantageously applied in all machines or tools in which objects have to be moved, in particular in machines or tools where a high positioning precision is required.

In a third aspect, the invention relates to a coordinate-measurement machine comprising the positioning system in accordance with the invention, wherein the coordinate-measurement machine comprises a probe for measuring coordinates of a measurement object, wherein, in operational use, the movable object is mechanically coupled to the probe or to the measurement object. This machine is a first main application area of the invention.

In a fourth aspect, the invention relates to a machine tool comprising the positioning system in accordance with the invention, wherein the machine tool comprises a machining head for machining a machining object, wherein, in operational use, the movable object is mechanically coupled to the machining head or to the machining object. This tool is a second main application area of the invention.

In a fifth aspect, the invention relates to a rapid-prototyping tool comprising the positioning system in accordance with the invention, wherein the rapid-prototyping tool comprises a body for adding material to a prototyping object and/or removing material, wherein, in operational use, the movable object is mechanically coupled to the material deposition head or to the prototyping object. This tool is a third main application area of the invention.

In a sixth aspect, the invention relates to an assembly robot, comprising the positioning system in accordance with the invention, wherein the assembly robot comprises a gripper for picking and placing components to an assembly object, wherein, in operational use, the movable object is mechanically coupled to the gripper or to the assembly object.

These and other aspects of the invention are apparent from and will be elucidated with reference to the embodiments described hereinafter.

LIST OF REFERENCE NUMERALS

Figure 1:
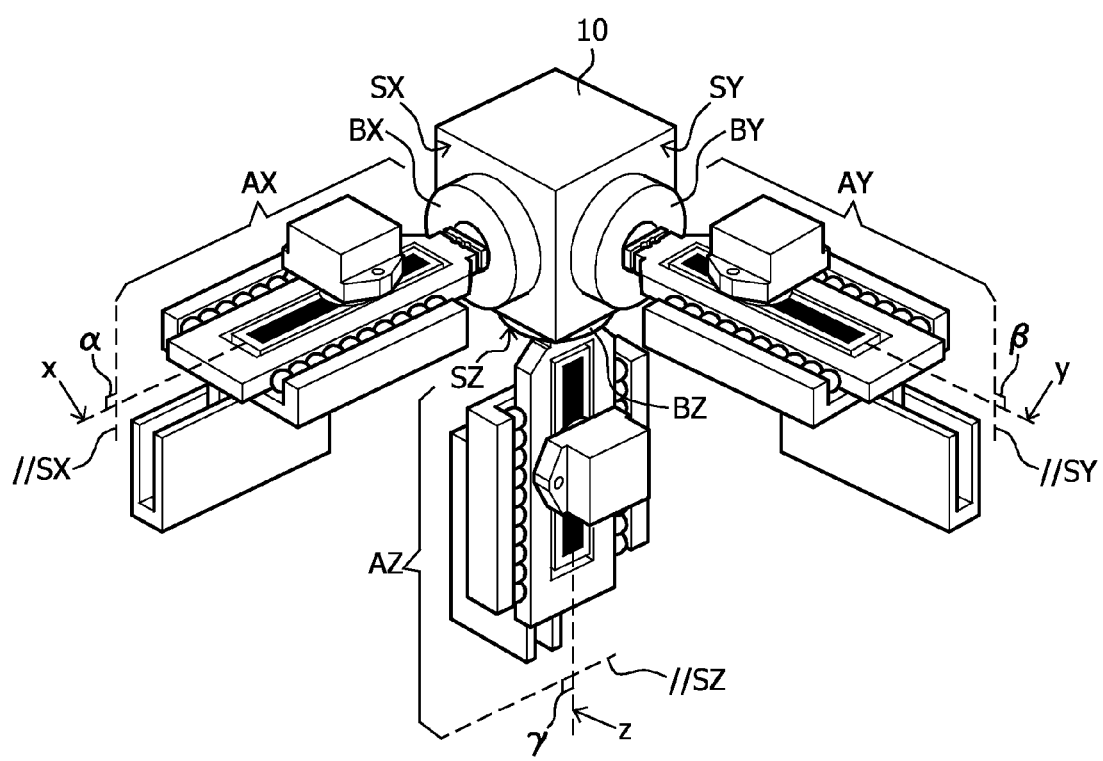
FIG. 1 schematically shows a positioning system in accordance with a first embodiment of the invention.

10 movable object
10' further movable object
20 coupling element
20a hinge axis
30 sliding stage
40 graduated ruler (linear scale)
50 roller bearings
60 frame
70 measurement head
80 extension part of stage 30
90 magnet track
100 actuator
X x-axis
$\alpha$ first angle
Y y-axis
$\beta$ second angle
Z z-axis
$\gamma$ third angle
SX first surface
SX1, SX2 first opposite surfaces (X-direction)
SY second surface
SY1, SY2 second opposite surfaces (Y-direction)
SZ third surface
SZ1, SZ2 third opposite surfaces (Z-direction)
AX first assembly/X-assembly (for positioning in X-direction)
AX1, AX2, AX2 first sub-assemblies (X-direction)
AY second assembly/Y-assembly (for positioning in Y-direction)
AY1, AY2, AY3, AY4 second sub-assemblies (Y-direction)
AZ third assembly/Z-assembly (for positioning in Z-direction)
AZ1, AZ2 third sub-assemblies (Z-direction)
BX first bearing
BX1, BX2 first sub-bearings (X-direction)
BY second bearing
BY1, BY2 second sub-bearings (Y-direction)
BZ third bearing
BZ1, BZ2 third sub-bearings (Z-direction)

RD1 first rotation direction
RD2 second rotation direction
G gravity

DETAILED DESCRIPTION OF THE PREFERRED EMBODIMENTS

The invention aims at providing a positioning system for positioning and/or measuring a movable object, wherein, during movement of the object less masses are moved than in the positioning system as known from the prior art. An important aspect of the invention resides in the use of bearings, which are driven by an actuator for positioning a surface of a movable object. The positioning system in accordance with the invention can be configured for 2-dimensional or 3-dimensional operation, further being referred to as 2-dimensional system and 3-dimensional system, respectively. The principle behind the invention is the same in both variants. Nevertheless, in 3-dimensional systems the advantageous effect is more profound. In the description, which follows this paragraph the focus is on 3-dimensional systems. The reader must keep in mind that in 2-dimensional systems the principles, effects, and operation are similar (but sometimes also less complex). The invention further aims at providing applications for such positioning system.

Throughout the description of the figures there is a lot of focus on systems wherein objects are positioned and measured at the same time (the measurements being carried out by a linear encoder or a short-range sensor). However, it must be noted that the invention is also applicable to systems where the objects are only positioned.

In order to facilitate the discussion of the detailed embodiments a few expressions are defined hereinafter.

Throughout this description and the claims the term "axis" (and "axes") should be interpreted as "imaginary axis (and imaginary axes)". This axis indicates a respective direction in which a respective actuator and/or respective measurement device operates. The actuator is arranged for positioning the respective surfaces of a movable object with respect to the respective axis. The axis does not necessarily need to extend in directions that are perpendicular to respective surfaces, although such embodiment does have particular advantages.

Throughout this description the term "movable object" either means a platform or carrier, which is coupled to a further object of interest or it refers to the object to be moved itself. This kinematic reversal does not alter the principle of the invention and does not depart from the scope of the invention as claimed.

FIG. 1 shows a positioning system in accordance with a first embodiment of the invention. The positioning system comprises a movable object 10 of which an object position has to be prescribed and measured. The movable object 10 has three orthogonally oriented surfaces SX, SY, SZ to which respective bearings BX, BY, BZ are provided. A first one of the respective bearings BX prescribes the object position of the movable object 10 with respect to a first axis X, also being referred to as the X-axis. The X-axis makes a first angle α with the first surface SX which is orthogonal in this example. A second one of the respective bearings BY prescribes the object position of the movable object 10 with respect to a second axis Y, also being referred to as the Y-axis. The Y-axis makes a second angle β with the second surface SY which is orthogonal in this example. A third one of the respective bearings BZ prescribes the object position of the movable object 10 with respect to a third axis Z, also being referred to as the Z-axis. The Z-axis makes a third angle γ with the third surface SZ which is orthogonal in this example. The first angle α, the second angle β, and the third angle γ need not be orthogonal in the invention. However, such configuration renders the positioning of the movable object 10 more simple.

The object position that is defined with respect to the X-axis is prescribed by a first assembly AX. The first assembly is also being referred to as X-assembly. The object position that is defined with respect to the Y-axis is prescribed by a second assembly AY. The second assembly is also being referred to as Y-assembly. The object position that is defined with respect to the Z-axis is prescribed by a third assembly AZ. The third assembly is also being referred to as Z-assembly.

The movable object 10 is typically a work piece table or tool carrier. Movement of the movable object 10 results in a relative motion between the work piece or tool and the system. The work piece is typically a product, artifact or it may be the table or carrier itself. The tool is typically a functional element in the machine, which performs a function like metrology or an operation on the product (e.g. assembly or processing). Typical examples of a tool are a probing system (metrology), an optical sensor (metrology), excimer laser (processing), vacuum pickup nozzle (assembly), chisel (processing), etc.

In the invention, the movable object 10 may have an arbitrary shape. What is important is that it has (in a 3D configuration) three or more planes SX, SY, SZ on which a bearing BX, BY, BZ is provided. Such bearing may be a contactless bearing (air bearing, magnetic bearing, electromagnetic bearing, etc). Contactless bearings provide more accurate positioning because any surface imperfections are averaged out. Moreover, wear of the system is less.

A contactless bearing allows free translation in two directions parallel to a plane of a surface opposite to the contactless bearing. Further, it allows rotation around its (symmetry) axis (orthogonal to the plane). The translation in the direction orthogonal to the plane and the two rotations around the two other axes parallel to the plane are prescribed by the interaction between the plane and the contactless bearing. The contactless bearing can be preloaded using additional bearings, gravity, vacuum, magnets, or other forces. In case one of the contactless bearings BX, BY, BZ is kept in place (fixated to the fixed world) this effectively limits the freedom of motion of the movable object 10 in the directions which are prescribed by the interaction between the contactless bearing and the movable object (translation in the direction orthogonal to the plane and the two rotations around the two axis parallel to the plane). In this way, when the translation of the contactless bearing in the direction orthogonal to the plane is controlled by a respective assembly BX, BY, BZ, the position of the movable object 10 can be manipulated and prescribed in this direction. This also applies for the other motions prescribed by the interaction (the two rotations around the two axis parallel to the plane).

Summarizing, the position and orientation of a contactless bearing BX, BY, BZ can be controlled, either by fixating, limiting, prescribing or actuating all its degrees of freedom. A rigid movable object 10 can translate in 3 directions parallel to the axes X, Y, Z and can rotate around these 3 axes. The translations and rotations together are called the degrees of freedom. Thus, a rigid movable object 10 has 6 degrees of freedom. When all its degrees of freedom are controlled the position and orientation of the movable object 10 in space is fully controlled. The contact between the respective contactless bearings BX, BY, BZ and the movable object 10 prescribes the relative motion between these bearings in the translation in the direction orthogonal to the respective planes and the two respective rotations around the two axes parallel to the respective planes. By fixating, limiting, prescribing or actuating these motions of the contactless bearings BX, BY, BZ, the motions of the movable object 10 in these directions can be manipulated. Furthermore, when the position of the contactless bearings BX, BY, BZ is measured or controlled (prescribed, guided or fixated) in these directions, the position of the movable object 10 in space can be calculated for these directions. By applying this to three or more planes on the movable object 10 it is possible to manipulate, control and measure the position of the movable object 10 in a 3D-space (in all its degrees of freedom). This is an important aspect of the invention. In the remaining part of the description several (possible) building blocks to control, manipulate and measure the position of the contactless bearings BX, BY, BZ are given.

Figure 2:
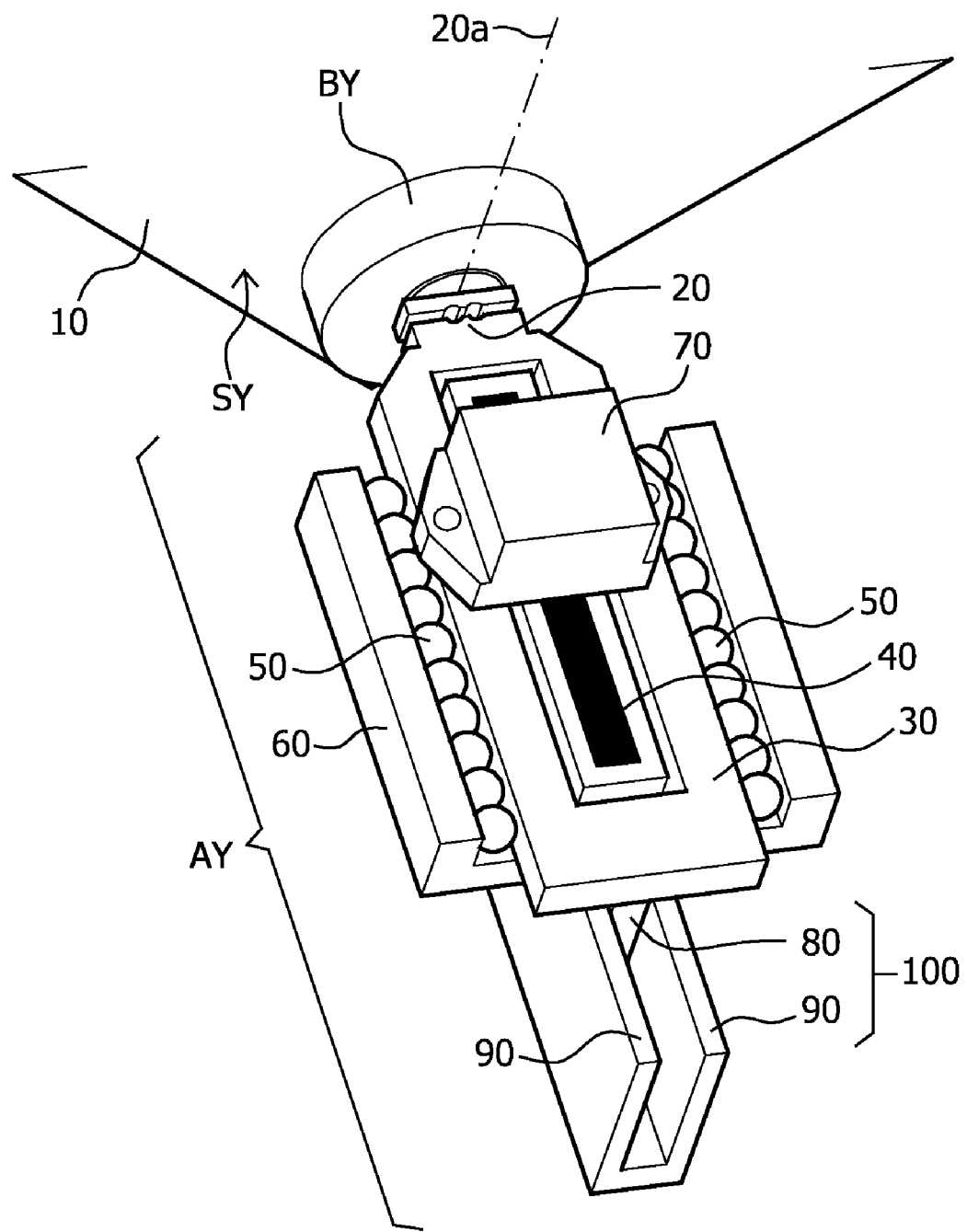
FIG. 2 schematically shows a zoomed view of the positioning system of FIG. 1.

FIG. 2 shows a zoomed view of the positioning system of FIG. 1. In this figure the second assembly AY is explained in more detail. This figure serves to explain the Y-axis positioning. The principles explained here are exactly the same for the positioning in the direction of the other axes. In this embodiment the second assembly AY comprises a stage 30 that is coupled to the bearing BY via a coupling element 20. On the stage 30 there is provided a linear scale 40. The stage 30 is received in a frame 60 that is mounted to the fixed world. The frame 60 is provided with a roller bearing 50 in order to form a guideway for the stage 30. A measurement head 70 is coupled to the stage 60 for measuring a relative position of the stage 30 with respect to the frame 60. The stage 30 is actuated, i.e. its position is prescribed, by an actuator 100. In this embodiment the actuator 100 comprises a magnet track 90 (also coupled to the fixed world) in which an extension part 80 of the stage 30 is received. The actuator further comprises actuator coils (not shown) for setting the position of the extension part 80 in the magnet track 90. Whether the extension part 80 is part of the actuator 100 or not is just a matter of definition.

A suitable measurement instrument for measuring the position of the bearing BY is a linear encoder. In FIG. 2 the linear encoder comprises the stage 30 with the graduated ruler 40 and the measurement head 70 which is arranged for measuring the relative motion of the stage 30 relative to the measurement head 70 in the length direction of the ruler 40. In FIG. 2 the stage is connected to the bearing BY and the measurement head 70 is connected to the frame 60. However, in alternative embodiments the measurement head 70 is connected to the bearing BY and the stage 30 with the ruler 40 is fixed to the fixed world.

By using multiple linear encoders or by using a similar system with a 2D grid the rotation of the bearing BY can be measured as well. A 2D grid works similar as a linear encoder. Instead of the linear graduated ruler a 2D grid is used which allows for the measurement of two translations. By using a second measurement head on this grid, also the rotation around the axis orthogonal to the grid can be measured.

For small rotations a short-range sensor (e.g. capacitive or optical) can also be used to measure the rotations of the bearing BY. This can also be combined with an encoder system that measures the translation and where (small) rotations are measured using one or more short-range sensors. Finally, one or more short-range sensor(s) can be used to measure the distance between the bearing BY (particularly relevant in case of a contactless bearing) and the movable object 10, e.g. to compensate for variations in the distance and angle between the contactless bearing BY and the movable object 10.

The connection between the measurement system (e.g. the stage 30, the graduated ruler 40, and measurement head 70 or short-range sensor) and the (contactless) bearing BY can be direct (measurement system operates directly on or is directly connected to the (contactless) bearing BY or via a coupling element 20. The coupling element 20 can be rigid or can purposely be left (relatively) flexible in one or more directions (translations and/or rotations). The purpose of flexibility in the coupling element 20 is discussed hereinafter.

As mentioned earlier, when the position of the (contactless) bearing BY or (contactless) bearings BX, BY, BZ is/are known, the position of the movable object 10 can be calculated (is known). The position of the (contactless) bearings can be known by measurement of the position (discussed earlier), by prescribing its position/limiting its motion (will be discussed later), or a combination of both. When the position of the (contactless) bearings is controlled (manipulated), the movable object 10 can be positioned in space. With "limiting the motion" of the movable object 10 is meant that, for the direction which is prescribed for which the movement is (purposely) kept limited, the position of the movable object 10 in its degrees of freedom (typically three translations and three rotations) is prescribed to a sufficient extend. With "to a sufficient extend" is meant that motion of the movable object 10 is still possible in this direction, but is kept to a magnitude, which is acceptable for the application.

Limitation of the motion of the (contactless) bearing is possible by mounting the (contactless) bearing BY on the stage 30. In this example, the stage 30 is guided by the roller bearing 50 over the frame 60. Naturally, the roller bearing 50 can be replaced by a bearing of any type, including contactless bearings, and the frame 60 can be a separate frame or a connection to the fixed world. In this example, the stage 30 can move with relative ease in its length direction. Movement in other directions and rotations of the stage 30 requires significantly more force. When movement in these other directions can be kept limited to a sufficient extend (as discussed earlier) these directions can be considered as prescribed by the guideway (frame 60 with roller bearing 50) for the remainder of this text. It must be noted that it is relatively easy to achieve this, because the stiffness of the guideway for movements in these directions (two translations and three rotations) is much higher than the stiffness against a translation in its length direction (which it is considered free to move in).

When the (contactless) bearing BY in this example is rigidly connected to the stage 30, the (contactless) bearing BY is free to translate in the length direction of the stage 30, but its translation in the other two directions and its rotations around the three axes is limited. Since the interaction between the (contactless) bearing BY and the movable object 10 prescribes the relative translation in the direction orthogonal to the plane of the surface BY of the movable object 10. The rotations around the axes parallel to this plane, i.e. the rotations of the movable object 10 around these axes parallel to the plane, are limited/prescribed by the contact with the (contactless) bearing BY, which is guided by the guideway via the stage 30. When the position of the stage 30 in its length direction is controlled and/or measured, the position of the movable object 10 in the direction orthogonal to the surface SY on which the (contactless) bearing BY operates can be manipulated and/or calculated, respectively.

In some situations, it can be advantageous when a coupling element 20 is used which has a relatively low stiffness in one or more translation and/or rotation directions. In FIG. 2 a line hinge/joint 20 is used, in which the stiffness for a rotation around a hinge axis 20a in the length direction of the line is much lower than the stiffness for other rotations and translations. This can be used in the design to give the (contactless) bearing BY freedom to rotate around this axis. Nevertheless, different coupling elements can be used as well, including a leaf spring, a slender rod, a cardan coupling (double pivoted joint), etc.

The effect of the line hinge/joint in FIG. 2 is that the (contactless) bearing BY is not rigidly connected to the stage 30 but can have a rotation relative to the stage 30 around one axis. The stiffness against a rotation around this axis is here significantly reduced with respect to the stiffness in the directions, i.e. translations and/or rotations, which are considered prescribed.

In FIG. 2 the stage 30 is guided on a guideway which prescribes all its motions, except a translation in its length direction, and the (contactless) bearing BY is connected to this stage 30 via a line hinge/joint 20 (coupling element), the (contactless) bearing BY can be translated in the length direction of the stage 30 and rotate around the axis of the line hinge/joint 20. As a result, the movable object 10 can rotate around this axis, but the rotation of the movable object 10 around the axis orthogonal to the line hinge/joint, but parallel to the plane on the object, is limited by the interaction between the (contactless) bearing (B) and the movable object 10. The principle of releasing degrees of freedom by the coupling element 20 in this can example can be easily extended to other coupling element types.

As mentioned earlier, when the (contactless) bearing BY is mounted on a stage 30, which is guided by a guideway relative to a frame or fixed world 60, the (contactless) bearing BY is free to translate in the length direction of the stage 30 (in the direction of the Y-axis). As a result of the interaction between movable object 10 and (contactless) bearing BY this allows for manipulation/control of the movable object 10.

The stage can be positioned using an actuator 100. In FIG. 2 a direct-drive motor is shown, comprising a magnet track 90, actuator coils (not shown) and a stage extension 80 that is driven by the actuator coils. It must be noted that other actuators can be used as well, such as a spindle, a piezo motor, and a piezo stepper. The actuator 100 controls the position of the stage 30 (by driving the stage extension 80). In the case of a direct-drive motor, the actuator exerts a force on the stage 30 which accelerates the stage (force=mass×acceleration). Typically, the position is then measured by a measurement system, such as the linear encoder, based on which the actuator force is controlled (using a closed-loop controller). Another option is to use an actuator, which positions the stage (e.g. a spindle drive). This type of actuator can be used in a closed loop (information of the measurement system is used as a feedback signal for the position) or in an open loop system.

To control both the position and rotation of the (contactless) bearing BY and thereby of the movable object 10, multiple actuators can be used, either in parallel or in series. One example when actuators operate in series is a long stroke translation actuator for the stage in series with one or more short stroke actuators that manipulate the angle of the (contactless) bearing BY relative to the stage 30, possibly over a coupling element 20. As such, it is possible to have a combination of long- and short stroke actuators working in parallel or in series. The angle and/or position of the movable object 10 can also be manipulated by using multiple (contactless) bearings that operate on the surface SY of the movable object 10. More information on such embodiments is given later in the description.

Figure 3:
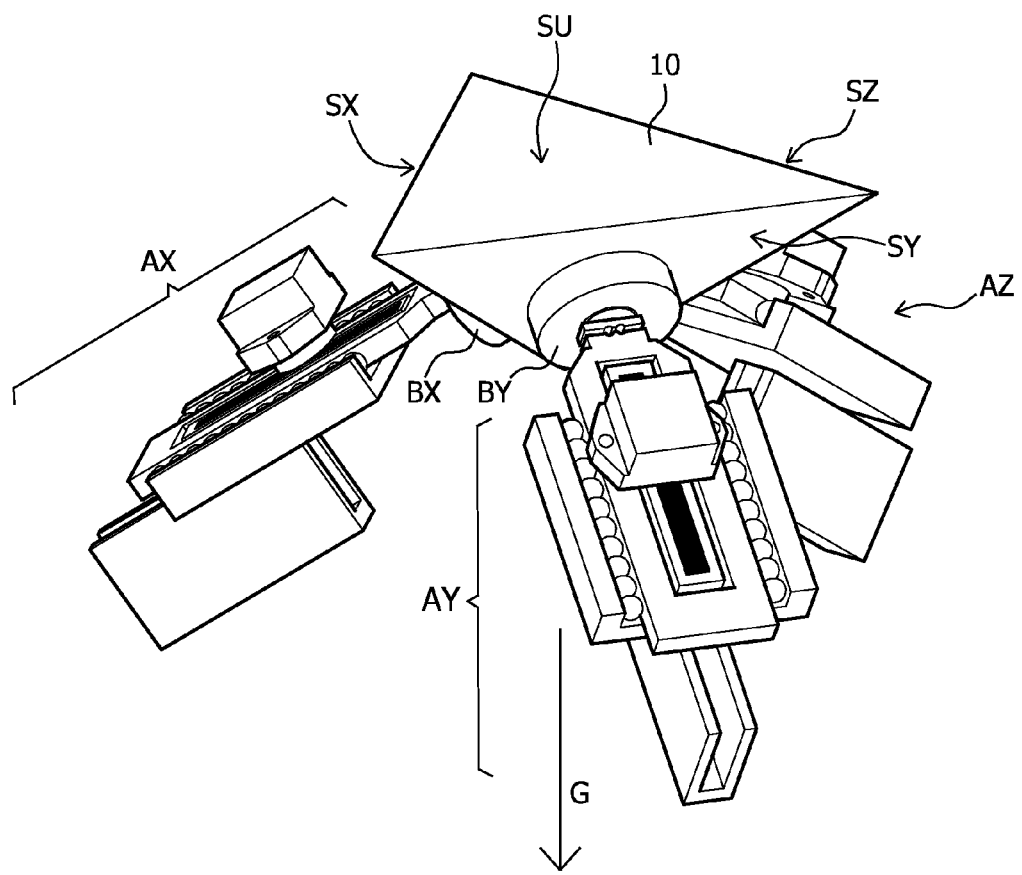
FIG. 3 schematically shows a positioning system in accordance with a second embodiment of the invention.

FIG. 3 shows a positioning system in accordance with a second embodiment of the invention. This embodiment is almost the same as the embodiment of FIG. 1 except for the fact that the three respective surfaces SX, SY, SZ now all have a similar orientation with respect to gravity G (the axes X, Y, Z are still all mutually orthogonal like in FIG. 1). The movable object 10 has a pyramid shape (upper surface SU is the base of the pyramid), which can be advantageous in applications where the movable object 10 functions as a table or support for a further object or functional element of the system. It must be stress however, that the movable object 10 may have any shape as long as it has three respective surfaces SX, SY, SZ for cooperation with the respective bearings BX, BY, BZ.

When the influence of internal deformations of the movable object 10 can be neglected for the purpose of the system, a minimum of 6 degrees of freedom of the object have to be controlled/measured/fixated (three translations and three rotations) to completely position the movable object in space. The three translations of the movable object 10 are measured using the linear encoders, which measure the translation of the movable object via the (contactless) bearings BX, BY, BZ (possibly in combination with a short-range sensor). The three rotations of the object are prescribed by the contact of the movable object 10 with the (contactless) bearings BX, BY, BZ. The (contactless) bearings BX, BY, BZ are connected to respective linear stages (guideways) via respective coupling elements (line hinge/joint). Each combination of the (contactless) bearing, coupling element and guideway in this example controls only rotation of the object (as earlier explained). By having the three stages as in FIG. 3 (with coupling elements and guideways) each rotation of the movable object 10 is controlled. In this embodiment there is no over-actuation.

Important advantages of the embodiments of FIGS. 1 and 3 are:

parallel guides and actuators that control the position of the movable object 10 (in comparison to the standard stages where guides are stacked);

an alignment of the measurement systems with the functional point in the machine;

low moving masses;

stationary reference of the measurement system (measurement head or graduated ruler of the linear encoder can be connected to the fixed world or a frame), which results in a system with good thermal and dynamic properties (and therefore good measurement uncertainty).

An additional advantage of the embodiment of FIG. 3 is the high level of symmetry, also with respect to gravity G. Every actuator is equally loaded by the gravity G, which makes their behavior more equal.

In the embodiments of FIGS. 1 and 3 the axes X, Y, Z (the functional line of the three linear encoders) all substantially cross in a single point. This features Abbe measurements, in case a functional point of the positioning system, i.e. a probe tip of a CMM, coincides with this point. More information about Abbe measurements can be found in the following references: E. Abbe, Messapparate für Physiker, Zeits, Fur Instrumenten-Kunde, 10, pp. 446-448 (1890) and P. H. J. Schellekens, et al., Design for Precision: Current Status and Trends, Annals of the CIRP, 47/1 (1998).

Figure 4:
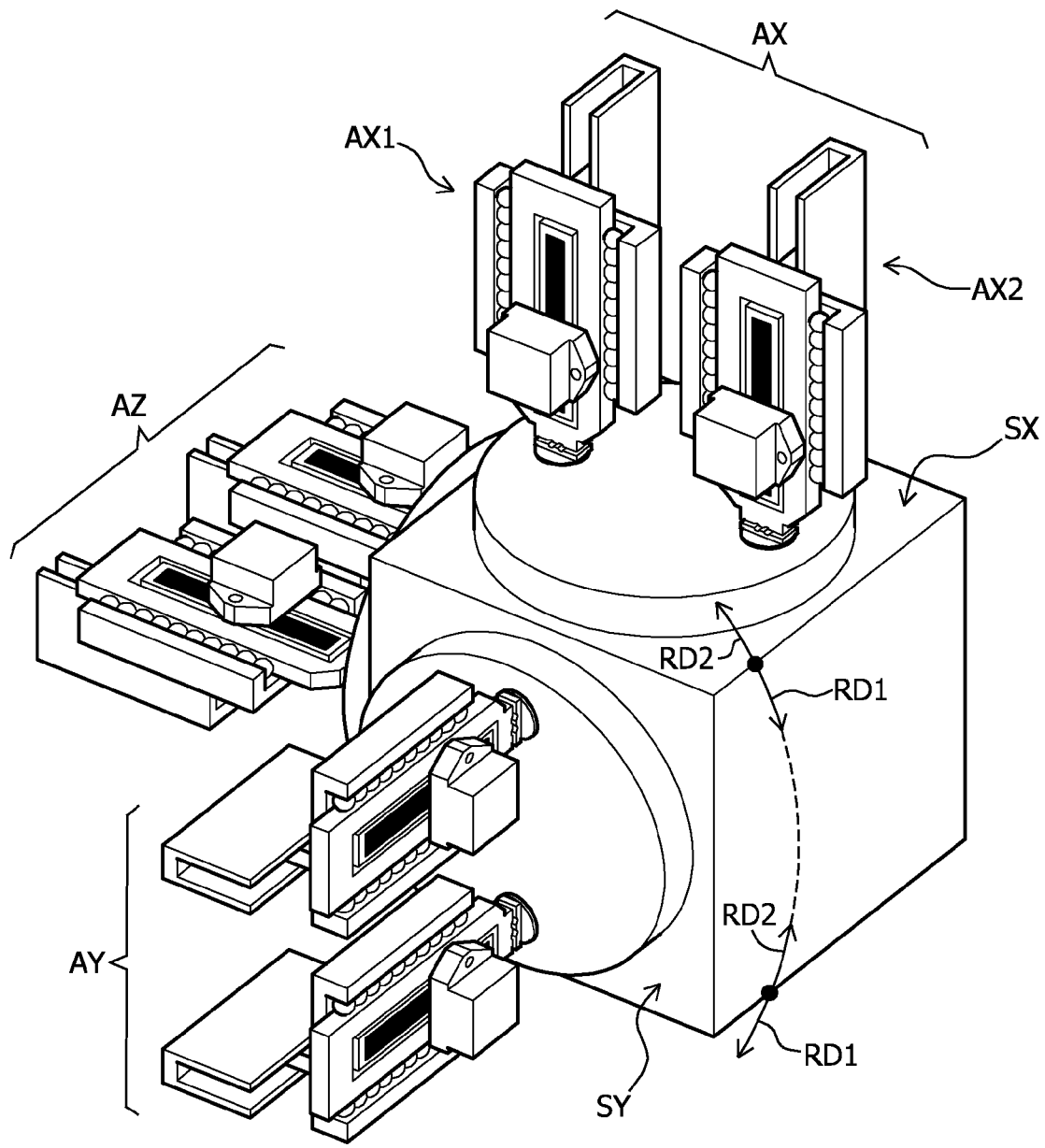
FIG. 4 schematically shows a positioning system in accordance with a third embodiment of the invention.

FIG. 4 shows a positioning system in accordance with a third embodiment of the invention. This embodiment will be discussed in as far as it differs from the previous embodiments. An object of this system is to provide not only the positioning of the movable object 10, but also the rotation of the same object. To achieve this effect, a main difference concerns the provision of more than one sub-assembly (actuator-linear encoder combination) on the respective surfaces SX, SY, SZ of the movable object 10. For instance, as is illustrated in FIG. 4 the first assembly AX for the positioning in the X-direction may comprise two first sub-assemblies AX1, AX2 that are both connected to the same first bearing BX (the bearing may need to be a bit larger to facilitate this). In FIG. 4 each first sub-assembly AX1, AX2 comprises a linear encoder and an actuator similar to earlier-mentioned embodiments. In case the sub-assemblies AX1, AX2 are designed such that they only facilitate a translation in the X-direction it is important to provide coupling elements between the sub-assemblies AX1, AX2 and the bearing BX which release at least one rotation degree of freedom to facilitate the rotation of the bearing (and thereby the movable object 10) in the opposite rotation directions RD1, RD2 illustrated in the drawing (directions are in the X, Z plane). The first rotation direction RD1 of the movable object 10 may be achieved by translating the upper assembly AX1 more than the lower assembly AX2 in the X-direction (whereby the respective coupling elements must facilitate the relative rotation of the bearing BX with respect to the respective sub-assemblies AX1, AX2. For the other direction the lower assembly AX2 has to be translated more than the upper sub-assembly AX1. Alternatively, in order to facilitate rotations in the indicated rotation directions RD1, RD2, the two first sub-assemblies AX1, AX2 may be moving in opposite directions or even opposite with respect to each other. The discussion for the other positioning directions Y, Z are the same as for the X-direction (similar structure and operation).

Figure 5:
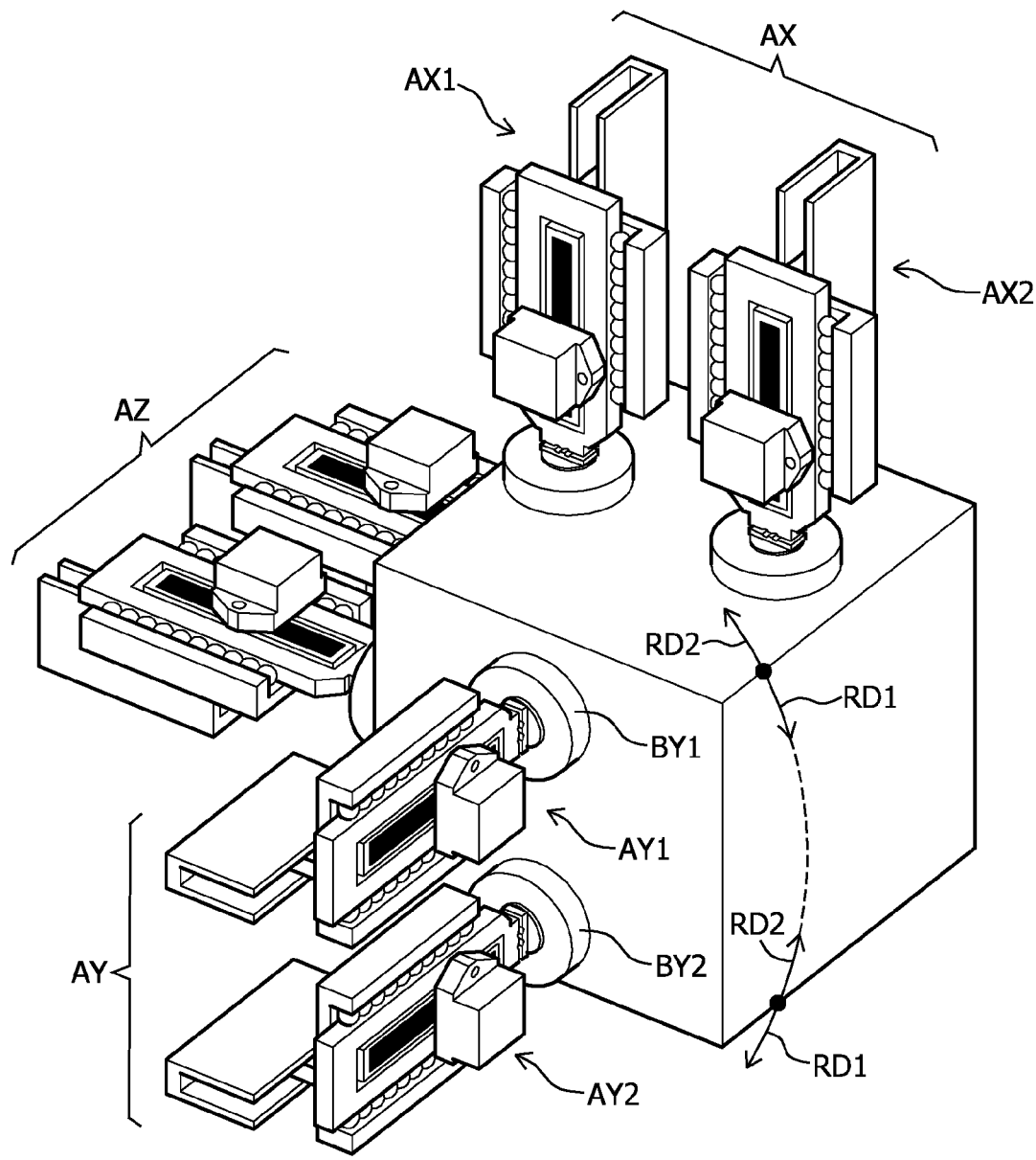
FIG. 5 schematically shows a positioning system in accordance with a fourth embodiment of the invention.

FIG. 5 shows a positioning system in accordance with a fourth embodiment of the invention. In fact, functionally, this embodiment is the same as FIG. 4. The only difference is that now each (second) sub-assembly AX1, AX2 has its own sub-bearing BX1, BX2 (and coupling element if necessary). The second sub-assemblies AX1, AX2 are designed to facilitate rotation of the movable object 10 in the illustrated rotations directions RD1, RD2 (in the X-Z plane).

Figure 6:
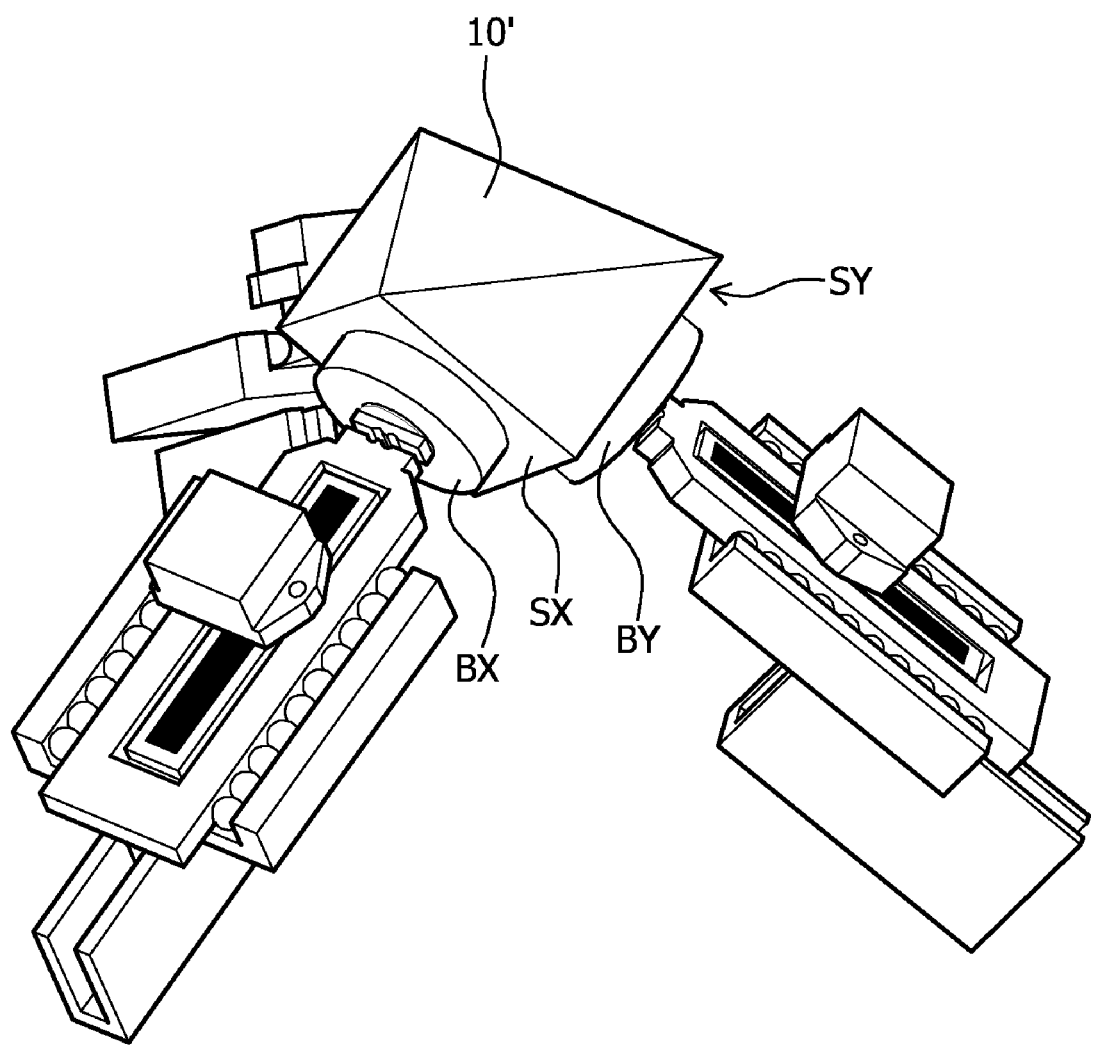
FIG. 6 schematically shows a positioning system in accordance with a fifth embodiment of the invention, and FIGS. 7a to 7c, 8a to 8c, 9a, and 9b schematically illustrate the principle of prescribing and releasing of "degrees of freedom" of a movable object using various variations of the positioning system.

FIG. 6 shows a positioning system in accordance with a fifth embodiment of the invention. This figure serves to illustrate a further movable object 10' with a different shape. Nevertheless, the further movable object 10' does have three (here orthogonally-oriented) surfaces SX, SY, SZ just like the previously discussed embodiments.

In all embodiments discussed above the focus has been on the positioning (and rotation) of a movable object 10 in a space. To this extend at least an actuator is required which operates on a surface of the movable object via a bearing. In the embodiments discussed linear encoders have been integrated with the actuators, which provide a very convenient solution in many applications. However, alternatively, additional short-range sensor(s) that have their own actuation can be provided, either directly on the same bearing or directly on the surface itself. Expressed differently, the invention deals with positioning and rotation of a movable object. Measurement of the position and orientation may be done in parallel (wherein both the actuator as well as the measurement devices are coupled to the respective bearing) with the positioning or it may be combined with it (using assembly of actuator and linear encoder as illustrated in the drawings). In any case, the additional short-range sensors may be used for measuring an air gap between an air bearing and the surface or they may be used for measuring the orientation of the air bearing and/or surface.

FIGS. 7a to 7c, 8a to 8c, 9a, and 9b schematically illustrate the principle of prescribing and releasing of "degrees of freedom" of a movable object using various variations of the positioning system. In all figures contactless bearings (air bearings or magnetic bearings) are assumed. The reference numerals in these figures indicate the same parts as in other drawings unless explicitly mentioned otherwise. The figures also serve to illustrate the many different variations that are possible in the positioning system of the invention, once it is known what degrees of freedom have to be prescribed, limited, measured, or released.

Figure 7A:
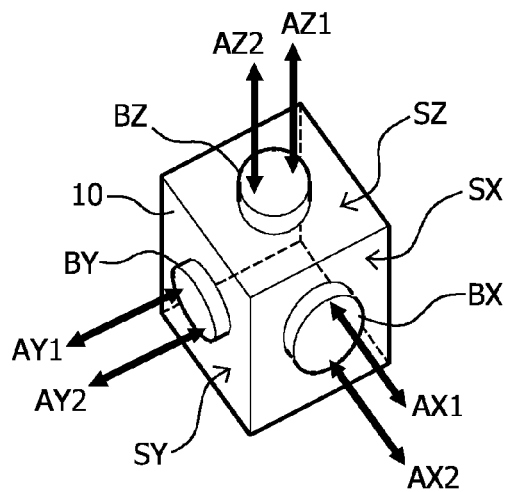
Figure 7B:
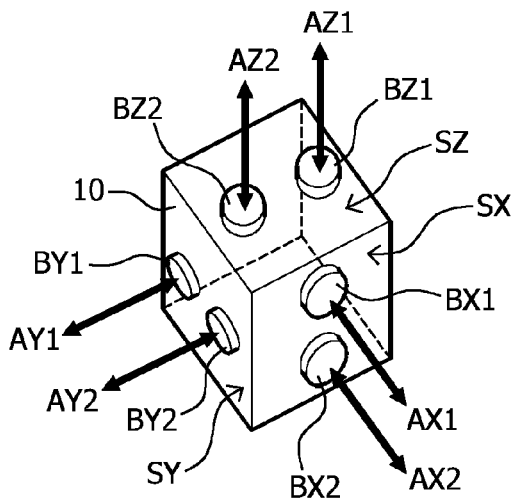
Figure 7C:
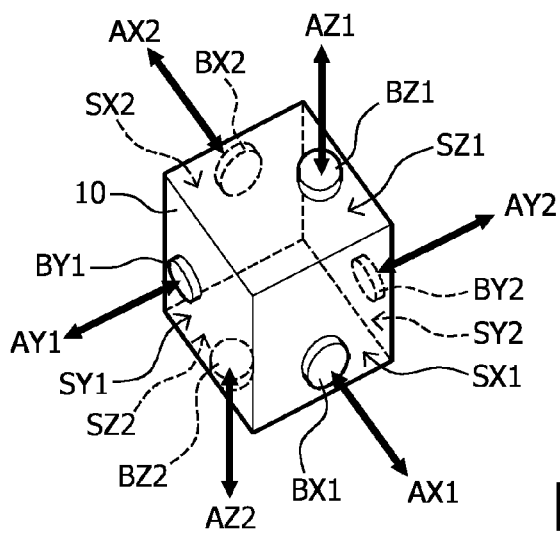

The variations in FIGS. 7a to 7c are, as a matter of fact, functionally the same. FIG. 7a illustrates the principle of more than one sub-actuator on a single bearing, whereas FIG. 7b illustrates the provision of more than one sub-bearing (having its own actuation) on a single surface. An interesting variation concerns FIG. 7c. In this embodiment the respective sub-actuators are not provided on the same surface of the movable object 10, but on opposite surfaces. For the X-direction the first one BX1 of the first sub-bearings is provided on a first one SX1 of first opposite surfaces, and the second one BX2 of the first sub-bearings is provided on a second one SX2 of the first opposite surfaces. Likewise, for the Y-direction the first one BY1 of the second sub-bearings is provided on a first one SY1 of second opposite surfaces, and the second one BY2 of the second sub-bearings is provided on a second one SX2 of the second opposite surfaces. Further, for the Z-direction the first one BZ1 of the third sub-bearings is provided on a first one SZ1 of third opposite surfaces, and the second one of the third sub-bearings BZ2 is provided on a second one SZ2 of the third opposite surfaces. In order to make FIG. 7c functionally the same as FIGS. 7a and 7b it is important that the respective axis of the actuators of the respective sub-bearings are not in line with each other but offset with respect to each other (making a momentum). Otherwise, rotation of the movable object is not possible through these sub-bearings.

Another situation is illustrated in FIGS. 8a and 8b, which are again functionally similar, as earlier explained. In these embodiments three first sub-assemblies AX1, AX2, AX3 are provided on the first surface SX. With this arrangement two rotations (X-Z plane and X-Y plane) of the movable object 10 can be prescribed. The second sub-assemblies AY1, AY2 are arranged to prescribe rotation in the Y-Z plane). Thus each rotation is only prescribed once.

Figure 8A:
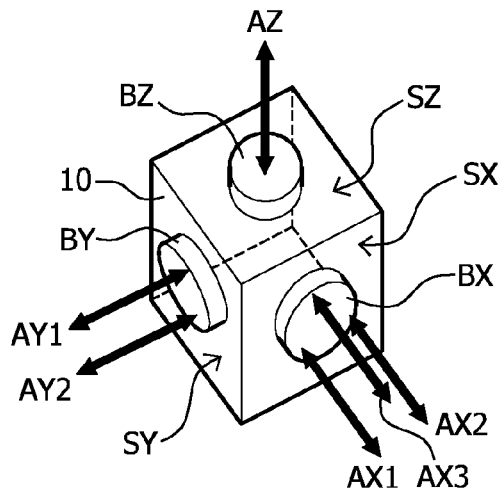
Figure 8B:
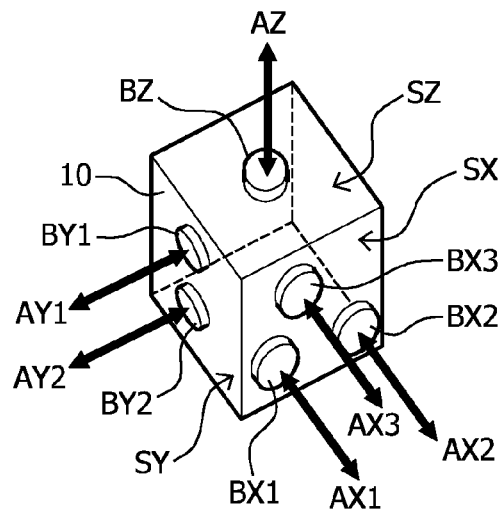
Figure 8C:
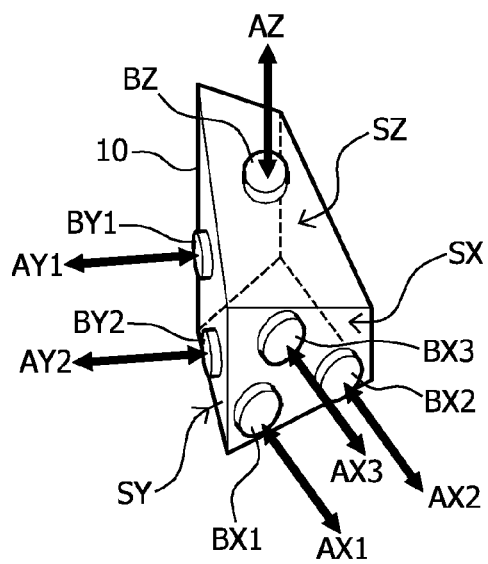

FIG. 8c differs from 8b in that the surfaces on which the bearings are provided are no longer orthogonal. Also, the respective axes need not be orthogonal to the respective surfaces. These features render the system more complex (non-Cartesian coordinates, over-actuation (redundancy), more coupling elements required, etc). However, this embodiment does not depart from the scope of the invention as claimed.

In many applications it may be desirable to prescribe every degree of freedom of the movable object 10 only once. Coupling elements may be needed to release at least one degree of freedom per (actuation) surface. Nevertheless, this is not essential. In case a certain degree of freedom of the movable object 10 is prescribed more than once, there is an over-actuation, unless the object is not rigid, i.e. can easily deform.

Figure 9A:
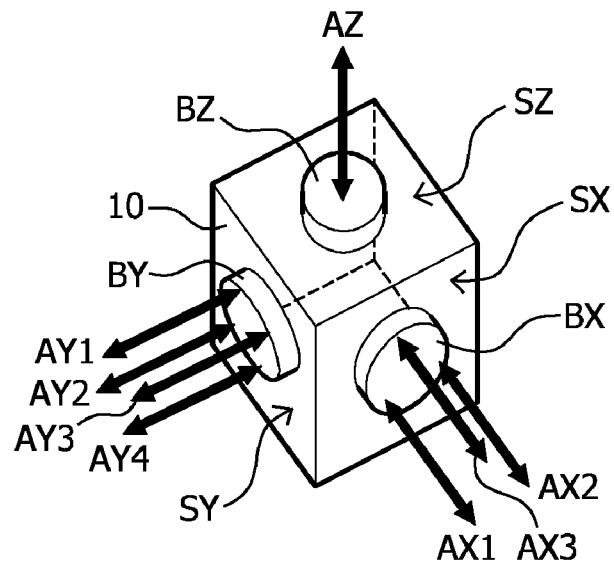
Figure 9B:
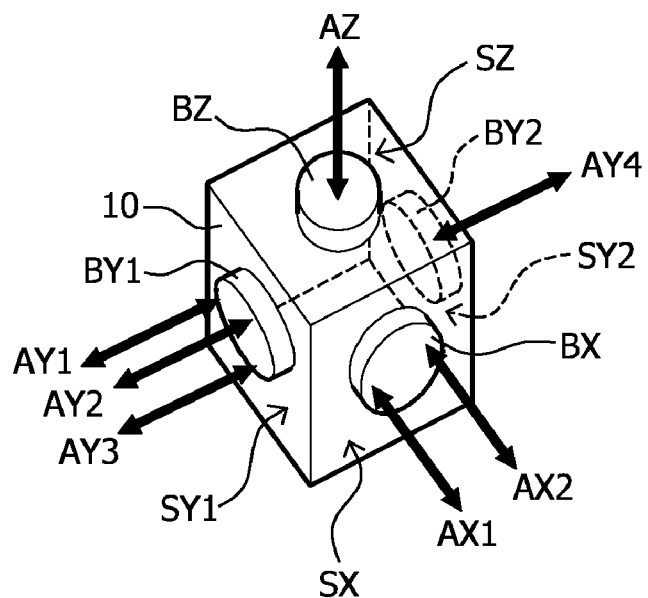

FIGS. 9a and 9b illustrate over-actuation situations. In FIG. 9a, in the Y-direction there are four second sub-assemblies AY1, AY2, AY3, AY4 operating on the second bearing BY on the second surface SY. This on itself is already over-actuation as only three sub-assemblies are required to make the respective second bearing BY rotate in the Y-Z plane and the X-Y plane. The rotation in the X-Y plane is also prescribed by the three first sub-assemblies AX1, AX2, AX2 operating on the first bearing BX (which prescribe rotation in the X-Z plane and the X-Y plane. In FIG. 9b, there are only two first sub-assemblies AX1, AX2 so that this side now only prescribes rotation in the X-Y plane. It must be noted that in FIG. 9b the rotation in the X-Z plane may no longer be varied by the first sub-assemblies AX1, AX2 (but it can be varied by the second sub-assemblies AY1, AY3). It may still be fixed by using a coupling-element between at least one of the bearings and the respective assemblies (for example between the third-bearing BZ and the third assembly AZ). Another difference between FIGS. 9b and 9a is that one of the four second sub-assemblies AX4 is provided on the other one SY2 of the second opposing surfaces SY1, SY2.

It is noted that the role of all actuators (arrows) acting on the contactless bearings can also be performed by a (combination of) bearings and/or elastic elements and/or coupling elements. Measurement of the position and/or angle of the contactless bearing gives information about the position of the movable object 10. To know the position of the movable object 10 completely, in all its degrees of freedom (DOF), requires that a minimum of 6 degrees of freedom are measured or prescribed. So, when the contactless bearing is rigidly connected to a guide that—fixates the rotation of the bearing, the angle of the movable object 10 is prescribed by the guideway via the contactless bearing and is thus known.

The invention thus provides a positioning system for positioning and/or measuring a movable object, wherein the movable object 10 has an object position that is defined with respect to a at least two axes X, Y extending at least into two different directions. The movable object 10 has a first surface SX and a second surface SY having mutually different orientations. The first surface SX makes a first angle with the first direction and the second surface SY makes a second angle with the second direction. The positioning system comprises: i) a first bearing BX for establishing a first surface position of the first surface SX with respect to the first axis X and for allowing a movement of the movable object 10 in a first plane parallel to the first surface SX in at least the second direction; ii) a second bearing BY for establishing a second surface position of the second surface SY with respect to the second axis Y and for allowing a movement of the movable object 10 in a second plane parallel to the second surface SY in at least the first direction. The system further comprises respective actuators for establishing the respective positions. Such system may be further extended to three dimensions. The advantage of the positioning system is that during movement of the movable object less masses are moved. The positioning system is widely applicable. The invention further provides a machine or a tool comprising such positioning system.

The invention may be applied in various application areas. For example, the invention may be applied in any machine that requires the positioning of an object in a space, such as coordinate measurement machines (CMM's), machine tools, rapid prototyping tools, and assembly robots.

A coordinate measuring machine (CMM) is a device for measuring the physical geometrical characteristics of an object. An operator may manually control this machine or the machine may be computer controlled. Coordinate-measuring machines generally include three main components: the main structure which includes the two or three axes of motion, the probing system, and data collection and reduction system (which typically includes a machine controller, desktop computer and application software).

A machine tool is a powered mechanical device, typically used to fabricate metal components of machines by machining, which is the selective removal of metal. The term machine tool is usually reserved for tools that use a power source other than human movement, but they can be powered by people if appropriately set up. Examples of machine tools that require an object to be moved are: broaching machine, drill press, gear shaper, hobbing machine, hone, lathe, milling machine, shaper, planer, stewart platform mills, and grinders. When fabricating or shaping parts, several techniques are used to remove unwanted metal. Among these are: EDM (electrical discharge machining), grinding, multiple edge cutting tools (cutting tool (metalworking)), and single edge cutting tools (cutting tool (metalworking)).

Rapid prototyping machines (or tools) are machines that fabricate components by selective addition of material.

Various variations of the system and machine or tool comprising such system in accordance with the invention are possible and do not depart from the scope of the invention as claimed. Many variations have been mentioned in the description above. A group of variations relates to the application claims.

In the earlier-mentioned coordinate measuring machine the movable object can be a support or table being coupled to the probe, or the support or table being coupled to the measurement object. Alternatively, the movable object can be the probe or the measurement object itself.

In the earlier-mentioned machine tool the movable object can be a support or table being coupled to the machining head, or the support or table being coupled to the machining object. Alternatively, the movable object can be the machining head or the machining object itself.

In the earlier-mentioned rapid-prototyping tool the movable object can be a support or table being coupled to the body, or the support or table being coupled to the prototyping object. Alternatively, the movable object can be the body or the prototyping object itself.

In the earlier-mentioned assembly robot the movable object can be a support or table being coupled to the gripper, or the support or table being coupled to the assembly object. Alternatively, the movable object can be the gripper or the assembly object itself.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the system claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. A positioning system for positioning and/or measuring a movable object, wherein, in operational use, the movable object has an object position that is defined with respect to a first axis extending in a first direction and a second axis extending in a second direction, wherein the second direction is different from the first direction, and wherein the movable object has a first surface and a second surface having mutually different orientations, wherein the first surface makes a first angle with the first direction and the second surface makes a second angle with the second direction, the positioning system comprising:

a first bearing for establishing a first surface position of the first surface with respect to the first axis and for allowing a movement of the movable object in a first plane parallel to the first surface in at least the second direction;

a second bearing for establishing a second surface position of the second surface with respect to the second axis and for allowing a movement of the movable object in a second plane parallel to the second surface in at least the first direction;

a first actuator being coupled to the first bearing, wherein the first actuator is for operating in the first direction of the first axis for establishing the first surface position, and a second actuator being coupled to the second bearing, wherein the second actuator is for operating in the second direction of the second axis for establishing the second surface position.

2. The positioning system as claimed in claim 1, wherein, in operational use the object position of the movable object is further defined with respect to a third axis extending in a third direction, wherein the third direction is different from the first direction and the second direction, and wherein the movable object has a third surface that has an orientation which is different from the respective orientations of the first surface and the second surface, wherein the third surface makes a third angle with the third direction, wherein the positioning system further comprises a third bearing for establishing a third position of the third surface with respect to the third axis and for allowing a movement of the movable object in a third plane parallel to the third surface in at least the first direction and/or the second direction, wherein the system further comprises a third actuator being coupled to the third bearing, wherein the third actuator is for operating in the third direction of the third axis.

3. The positioning system as claimed in claim 1, further comprising the movable object.

4. The positioning system as claimed in claim 3, wherein the movable object is rigid.

5. The positioning system as claimed in claim 2, wherein the first direction is orthogonal to the first surface, and the second direction is orthogonal to the second surface, and the third direction is orthogonal to the third surface.

6. The positioning system as claimed in claim 5, wherein the respective axes are orthogonal with respect to each other.

7. The positioning system as claimed in claim 1, wherein the respective surfaces are orthogonal with respect to each other.

8. The positioning system as claimed in claim 2, further comprising a first linear encoder coupled to the first bearing, a second linear encoder coupled to the second bearing, and a third linear encoder coupled to the third bearing, wherein the first linear encoder is arranged for measuring the first surface position in operational use, the second linear encoder is arranged for measuring the second surface position in operational use, and the third linear encoder is arranged for measuring the third surface position in operational use.

9. The positioning system as claimed in claim 1, wherein the actuators are coupled to their corresponding bearing by a coupling element for allowing a rotation of the movable object in operational use.

10. The positioning system as claimed in claim 9, wherein the respective bearing on at least one of the respective surfaces comprises at least two sub-bearings that are spaced apart from each other, wherein the sub-bearings are arranged for further establishing a surface orientation of the respective surface in operational use and for allowing a movement of the movable object in a plane parallel to the respective surface in at least the first and/or second direction in operational use, wherein the surface orientation is determined by a mutual position of the sub-bearings.

11. The positioning system as claimed in claim 9, wherein the respective actuator coupled to the respective bearing on at least one of the respective surfaces comprises at least two sub-actuators that are spaced apart from each other, wherein the sub-actuators are arranged for further establishing a bearing orientation of the respective bearing, wherein the bearing orientation is determined by a mutual position of the sub-actuators.

12. The positioning system as claimed in claim 1, further comprising at least one short-range sensor on at least one of the respective surfaces for measuring an orientation of a respective one of the bearings or a respective one of the surfaces in operational use, and/or for measuring a positioning error caused by the respective bearing in operational use.

13. The positioning system as claimed in claim 1, further comprising at least one further short-range sensor on at least one of the respective bearings for measuring at least one respective bearing orientation of the at least one respective bearings in operational use.

14. The positioning system as claimed in claim 2, wherein the first surface, the second surface and the third surface are mutually oriented such that, in operational use, their orientations with respect to gravity are substantially the same.

15. The positioning system as claimed in claim 2, wherein at least two of the respective axes substantially cross in a single point, which corresponds with a predetermined functional point of the system.

16. The positioning system as claimed in claim 2, wherein the respective bearings are contactless bearings.

17. The positioning system as claimed in claim 16, wherein the respective bearings are selected from a group comprising: air bearing, magnetic bearing, and electromagnetic bearing.

18. The positioning system as claimed in claim 17, wherein the respective bearings are preloaded by vacuum, magnetic force, spring force, or gravity.

19. A machine or a tool comprising the positioning system as claimed in claim 1, further comprising a frame for supporting the positioning system.

20. A coordinate-measurement machine comprising the positioning system as claimed in claim 1, further comprising a probe for measuring coordinates of a measurement object, wherein, in operational use, the movable object is mechanically coupled to the probe or to the measurement object.

* * * * *